(12) United States Patent
Gross et al.

(10) Patent No.: US 7,100,079 B2
(45) Date of Patent: Aug. 29, 2006

(54) METHOD AND APPARATUS FOR USING PATTERN-RECOGNITION TO TRIGGER SOFTWARE REJUVENATION

(75) Inventors: Kenny C. Gross, San Diego, CA (US); Kishor S. Trivedi, Durham, NC (US)

(73) Assignee: Sun Microsystems, Inc., Santa Clara, CA (US)

(*) Notice: Subject to any disclaimer, the term of this patent is extended or adjusted under 35 U.S.C. 154(b) by 571 days.

(21) Appl. No.: 10/277,445

(22) Filed: Oct. 22, 2002

(65) Prior Publication Data

US 2004/0078657 A1    Apr. 22, 2004

(51) Int. Cl.
 *G06F 11/00* (2006.01)
(52) U.S. Cl. .......................... 714/23; 714/47
(58) Field of Classification Search ................. 714/15, 714/23, 47

See application file for complete search history.

(56) References Cited

U.S. PATENT DOCUMENTS

| | | | |
|---|---|---|---|
| 4,937,763 A | | 6/1990 | Mott ............................ 364/550 |
| 5,287,505 A | * | 2/1994 | Calvert et al. ................. 707/10 |
| 6,216,226 B1 | * | 4/2001 | Agha et al. ..................... 713/2 |
| 6,243,666 B1 | * | 6/2001 | Boone et al. .................. 703/20 |
| 6,629,266 B1 | * | 9/2003 | Harper et al. ................. 714/38 |
| 6,810,495 B1 | * | 10/2004 | Castelli et al. ................ 714/47 |
| 6,820,215 B1 | * | 11/2004 | Harper et al. ................. 714/15 |
| 6,845,474 B1 | * | 1/2005 | Circenis et al. ............... 714/48 |

| | | | |
|---|---|---|---|
| 2003/0079154 A1 | * | 4/2003 | Park et al. ..................... 714/1 |

OTHER PUBLICATIONS

Bobbio et al., "Fine Grained Software Rejuvenation Models", Computer Performance and Dependability Symposium, 1998. IPDS '98. Proceedings. IEEE International Sep. 7-9, 1998 pp. 4-12.*

Dohi et al., "Analysis of software cost models with rejuvenation", High Assurance Systems Engineering, 2000, Fifth IEEE International Symposim on. HASE 2000 Nov. 15-17, 2000 pp. 25-34.*

Garg et al., "On the analysis of software rejuvenation policies", Computer Assurance, 1997. COMPASS '97. 'Are We Making Progress Towards Computer Assurance?'. Proceedings of the 12th Annual Conference onJun. 16-19, 1997 pp. 88-96.*

(Continued)

*Primary Examiner*—Robert Beausoliel
*Assistant Examiner*—Gabriel Chu
(74) *Attorney, Agent, or Firm*—Park, Vaughan & Fleming LLP; Edward J. Grundler (57) ABSTRACT

One embodiment of the present invention provides a system that facilitates using a multi-variate pattern-recognition technique to trigger software rejuvenation for a computer system. The system operates by periodically measuring values of a target set of performance parameters associated with the computer system while the computer system is operating. The system then predicts values for the target set of performance parameters based upon previously determined correlations between performance parameters in the target set of performance parameters. If the predicted values deviate beyond a predetermined threshold from the measured values, thereby indicating that software aging is likely to have occurred, the system schedules a software rejuvenation operation for the computer system.

27 Claims, 5 Drawing Sheets

OTHER PUBLICATIONS

Huang et al., "Software Rejuvenation: Analysis, Module and Applications", 1995 IEEE.*

Trivedi et al., "Modeling and analysis of software aging and rejuvenation", Simulation Symposium, 2000. (SS 2000) Proceedings. 33rd Annual Apr. 16-20, 2000 pp. 270-279.*

Vaidyanathan et al., "A measurement-based model for estimation of resource exhaustion in operational software systems", Software Reliability Engineering, 1999. Proceedings. 10th International Symposium on Nov. 1-4, 1999 pp. 84-93.*

Wang et al., "Checkpointing and its applications", Fault-Tolerant Computing, 1995. FTCS-25. Digest of Papers., Twenty-Fifth International Symposium on Jun. 27-30, 1995 pp. 22-31.*

* cited by examiner

METHOD AND APPARATUS FOR USING PATTERN-RECOGNITION TO TRIGGER SOFTWARE REJUVENATION

BACKGROUND

1. Field of the Invention

The present invention relates to the design of highly reliable computer systems. More specifically, the present invention relates to a method and an apparatus that uses pattern-recognition techniques to trigger software rejuvenation in order to enhance performance and availability in computer systems.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure reliability in such enterprise computing systems.

Unfortunately, as computer systems run for longer periods of time, they are increasingly affected by a phenomenon known as "software aging." Software aging is typically caused by resource contention problems that build up over time until the computer system eventually hangs, panics, crashes or otherwise grinds to a halt. Software aging can be caused by a multitude of factors, including memory leaks, unreleased file locks, accumulations of unterminated threads, data round-off accrual, file space fragmentation, shared memory pool latching and thread stack bloating.

Many of the adverse effects of software aging can be mitigated through a technique known as "software rejuvenation." Software rejuvenation operates by cleaning up the internal state of a computer system and/or application to prevent the occurrence of more severe crash failures in the future. For some extreme problems, software rejuvenation can involve therapeutic reboots. However, less drastic measures suffice for the vast majority of software aging problems, such as flushing stale locks, reinitializing application components, preemptively rolling back, defragmenting memory and shutting down individual applications.

Figure 1:
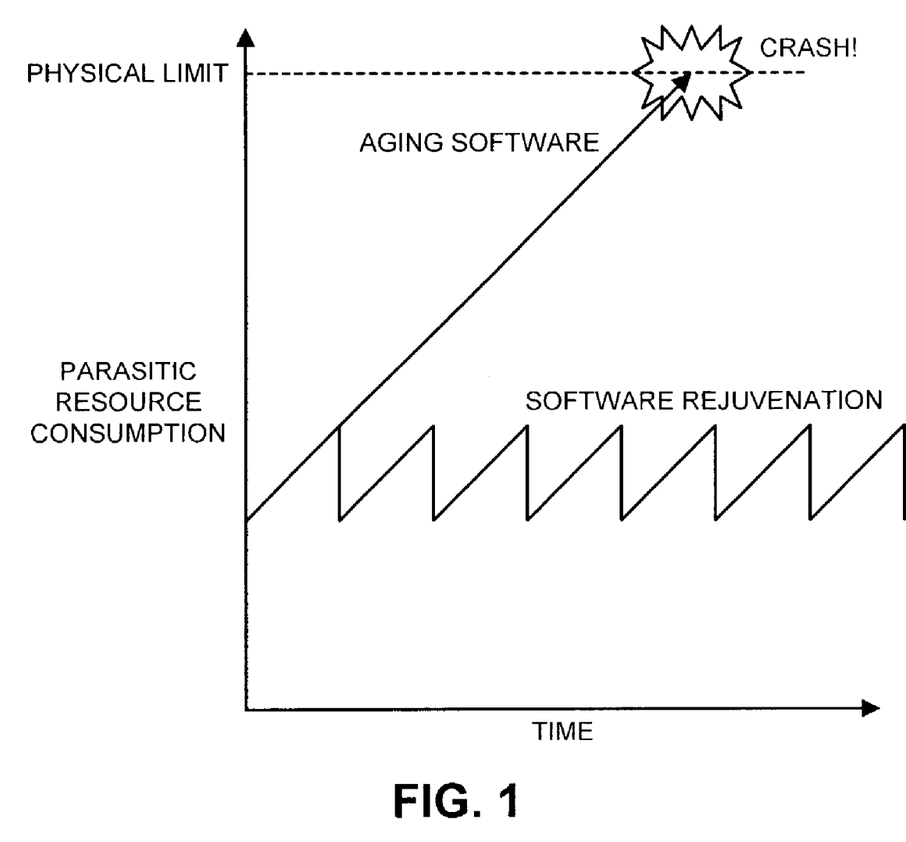
FIG. 1 illustrates effects of software rejuvenation process in accordance with an embodiment of the present invention.

If the software aging is caused by parasitic resource consumption (for example, a memory leak), periodic software rejuvenation can restore the resource and can thereby avoid a system crash caused by shortage of the resource as is illustrated by FIG. 1.

Unfortunately, it is very hard to determine when these software rejuvenation operations are required. Some existing systems monitor a single system parameter. For example, some systems monitor an amount of free memory, and if the amount of free memory falls below a threshold value, they perform a software rejuvenation operation in an attempt to free up some memory. Unfortunately, this technique is only effective in mitigating known types of software aging problems (such as memory leaks) that can be detected by monitoring a single system parameter.

Other systems perform software rejuvenation at periodic intervals. However, this may not catch software aging problems that arise between the periodic intervals. On the other hand, if these periodic rejuvenation operations are performed too frequently, they can unnecessarily degrade system performance.

What is needed is a method and an apparatus for performing software rejuvenation operations without the limitations and problems of the above-described techniques.

SUMMARY

One embodiment of the present invention provides a system that facilitates using a multi-variate pattern-recognition technique to trigger software rejuvenation for a computer system. The system operates by periodically measuring values of a target set of performance parameters associated with the computer system while the computer system is operating. The system then predicts values for the target set of performance parameters based upon previously determined correlations between performance parameters in the target set of performance parameters. If the predicted values deviate beyond a predetermined threshold from the measured values, thereby indicating that software aging is likely to have occurred, the system schedules a software rejuvenation operation for the computer system.

In a variation on this embodiment, the system additionally determines correlations between parameters in the target set of performance parameters based on measurements gathered during a training mode that takes place during normal error-free operation of the computer system.

In a variation on this embodiment, the system additionally prefilters a larger set of performance parameters to identify the target set of performance parameters. This pre-filtering operation eliminates redundant and/or poorly correlated performance parameters from the larger set of performance parameters to produce the target set of performance parameters.

In a further variation, the pre-filtering operation determines correlations between performance parameters based on measurements of the larger set of performance parameters gathered during a training mode.

In one embodiment of the present invention, scheduling the software rejuvenation operation involves sequencing the software rejuvenation operation in a way that substantially minimizes cost of the software rejuvenation operation.

In one embodiment of the present invention, the software rejuvenation operation can involve: flushing stale locks, reinitializing application components, defragmenting memory, purging database shared memory pool latches, failing over between computing nodes, shutting down individual applications, preemptively rolling back, and performing a therapeutic reboot.

In one embodiment of the present invention, the target set of performance parameters can include: system throughput parameters, processor load, system queue lengths, transaction latency, and an amount of available memory.

In one embodiment of the present invention, the tasks of predicting values for the target set of performance parameters and scheduling the software rejuvenation operation are performed by a service processor that is co-located with other processors in the computer system.

In one embodiment of the present invention, the tasks of predicting values for the target set of performance parameters and scheduling the software rejuvenation operation are performed by a remote service center that communicates with the computer system across a network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 2A:
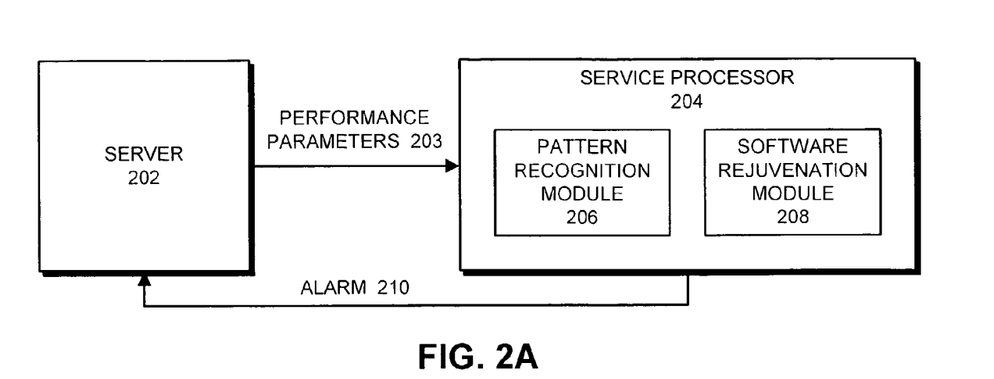
FIG. 2A illustrates a service processor that schedules software rejuvenation operations in accordance with an embodiment of the present invention.

FIG. 2A illustrates a service processor 204 that schedules software rejuvenation operations for a server 202 in accordance with an embodiment of the present invention. Server 202 and service processor 204 can generally include any type of computer system, including, but not limited to, a computer system based on a microprocessor, a mainframe computer, a digital signal processor, a portable computing device, a personal organizer, a device controller, and a computational engine within an appliance.

During operation, service processor 204 monitors performance parameters 203 from server 202. Service processor 204 uses pattern recognition module 206 to detect if a rejuvenation operation should be scheduled. If so, service processor 204 uses software rejuvenation module 208 to schedule one or more software rejuvenation operations. These rejuvenation operations can be initiated by sending an alarm signal 210 (or other command) to server 202, or alternatively to a system administrator in charge of server 202.

In one embodiment of the present invention, service processor 204 monitors performance parameters from a cluster of servers, including server 202. This cluster of servers is located in the same enclosure as service processor 204.

Figure 2B:
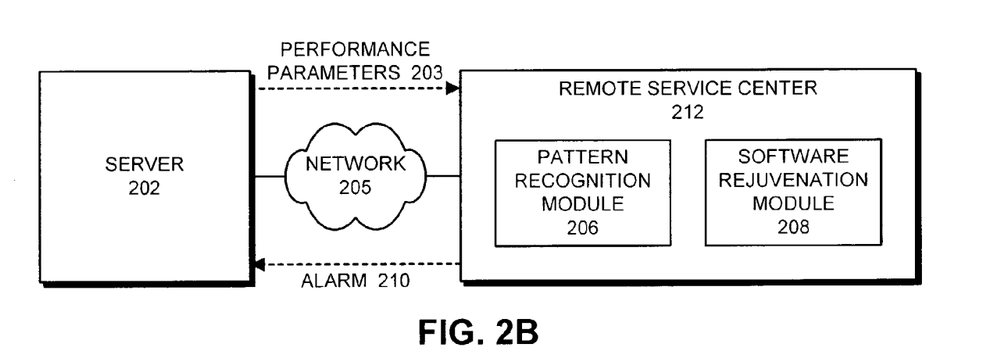
FIG. 2B illustrates a remote service center that schedules software rejuvenation operations in accordance with an embodiment of the present invention.

FIG. 2B illustrates a remote service center 212 that schedules software rejuvenation operations in accordance with an embodiment of the present invention. Remote service center 212 operates in the same way as service processor 204, except that remote service center 212 communicates with server 202 remotely through network 205. Network 205 can generally include any type of wire or wireless communication channel capable of coupling together computing nodes. This includes, but is not limited to, a local area network, a wide area network, or a combination of networks. In one embodiment of the present invention, network 205 includes the Internet.

During operation, remote service center 212 receives performance parameters 203 from server 202 and, if necessary, initiates software rejuvenation by sending sends alarm signal 210 or other commands to server 202 or to a system administrator.

Software Rejuvenation System

Figure 3:
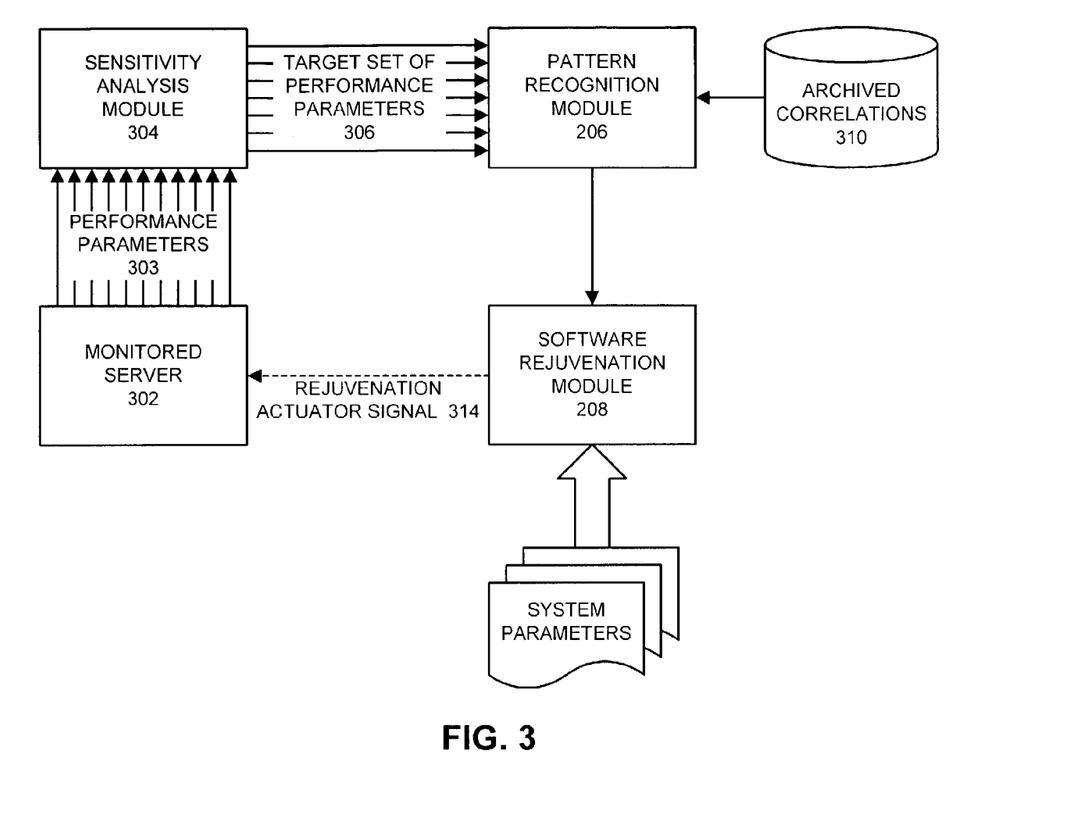
FIG. 3 illustrates a system for performing software rejuvenation in accordance with an embodiment of the present invention.

FIG. 3 illustrates a system for performing software rejuvenation in accordance with an embodiment of the present invention. During operation, this system monitors certain dynamic system performance parameters and uses pattern recognition techniques to detect the incipience of conditions leading to software aging. The system also estimates the time remaining until the resource contention reaches a critical level, and then schedules one or more rejuvenation actions for an application, a process group, a cluster node or an entire domain, depending on the pervasiveness of the resource exhaustion.

This system is made up of number of modules, including sensitivity analysis module 304, pattern recognition module 206, and software rejuvenation module 208. Sensitivity analysis module 304 operates during a training mode and is typically initiated whenever the system configuration changes significantly. Referring to the flow chart illustrated in FIG. 4, sensitivity analysis module 304 gathers a large number of performance parameters 303 from a monitored server (or cluster of servers) 302 (step 402). These performance parameters 303 can include parameters relating to: system throughput, processor load, system queue lengths, transaction latency, I/O traffic and amount of available memory. Note that in general there can be hundreds of monitored parameters.

Figure 4:
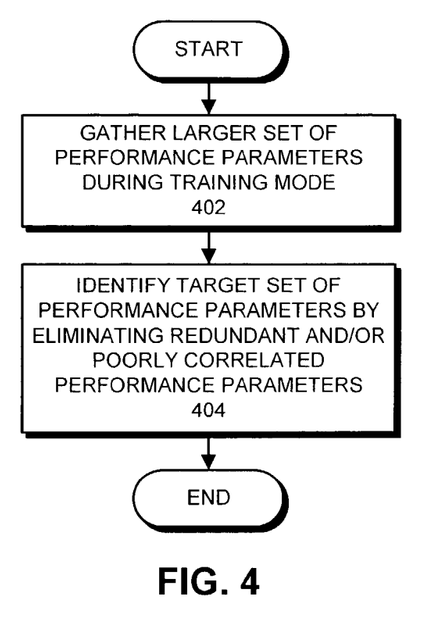
FIG. 4 presents a flow chart illustrating how a target set of performance parameters is identified in accordance with an embodiment of the present invention.

Sensitivity analysis module 304 then selects a subset of these parameters that provide maximal information content for a subsequent pattern recognition surveillance process. This can be accomplished by eliminating parameters that are redundant, are poorly correlated with other parameters, or are otherwise unsuitable for data-driven empirical modeling. Note that the resulting target set of performance parameters 306 is significantly smaller than the initial set of performance parameters 303 (step 404). For example, in one embodiment of the present invention, sensitivity analysis module 304 reduces about 240 performance parameters 303 to a smaller set of about 40 target performance parameters 306.

Figure 5:
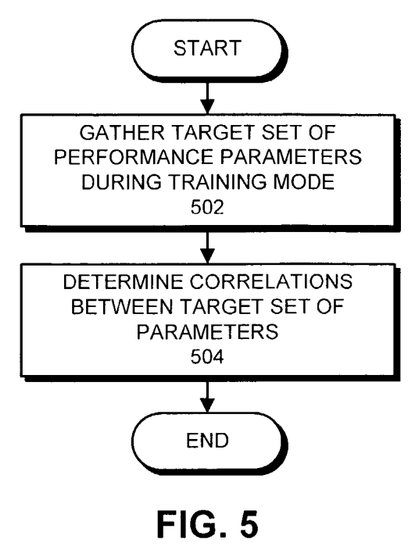
FIG. 5 presents a flow chart illustrating how correlations between performance parameters are determined in accordance with an embodiment of the present invention.

After the target set of performance parameters 306 is selected, pattern recognition module 206 (in FIG. 3) monitors the target set of performance parameters during a training mode. Referring to the flow chart that appears in FIG. 5, pattern recognition module 206 gathers a target set of performance parameters (step 502) and then determines correlations between parameters in the target set of performance parameters using one or more techniques for establishing such correlations (step 504). Note that many multi-variate pattern recognition and/or correlation techniques are well-known in the art and will not be discussed further in this specifications. Identified correlations are then archived in a database 310 for use in subsequent surveillance operations. Note that this process of determining patterns and correlations can be performed periodically, or whenever the configuration of the computer system changes (even in a small way).

During a subsequent surveillance mode, pattern recognition module 206 examines the target set of parameters and uses the archived correlations to determine if software aging is taking place. This process is described in more detail below with reference to FIG. 6. If software aging is detected, the system triggers software rejuvenation module 208, which sequences the rejuvenation operation in way that substantially minimizes the "cost" of the rejuvenation action. For example, the system may schedule a therapeutic reboot or other rejuvenation operation for a less busy time of the day.

Software Rejuvenation Process

Figure 6:
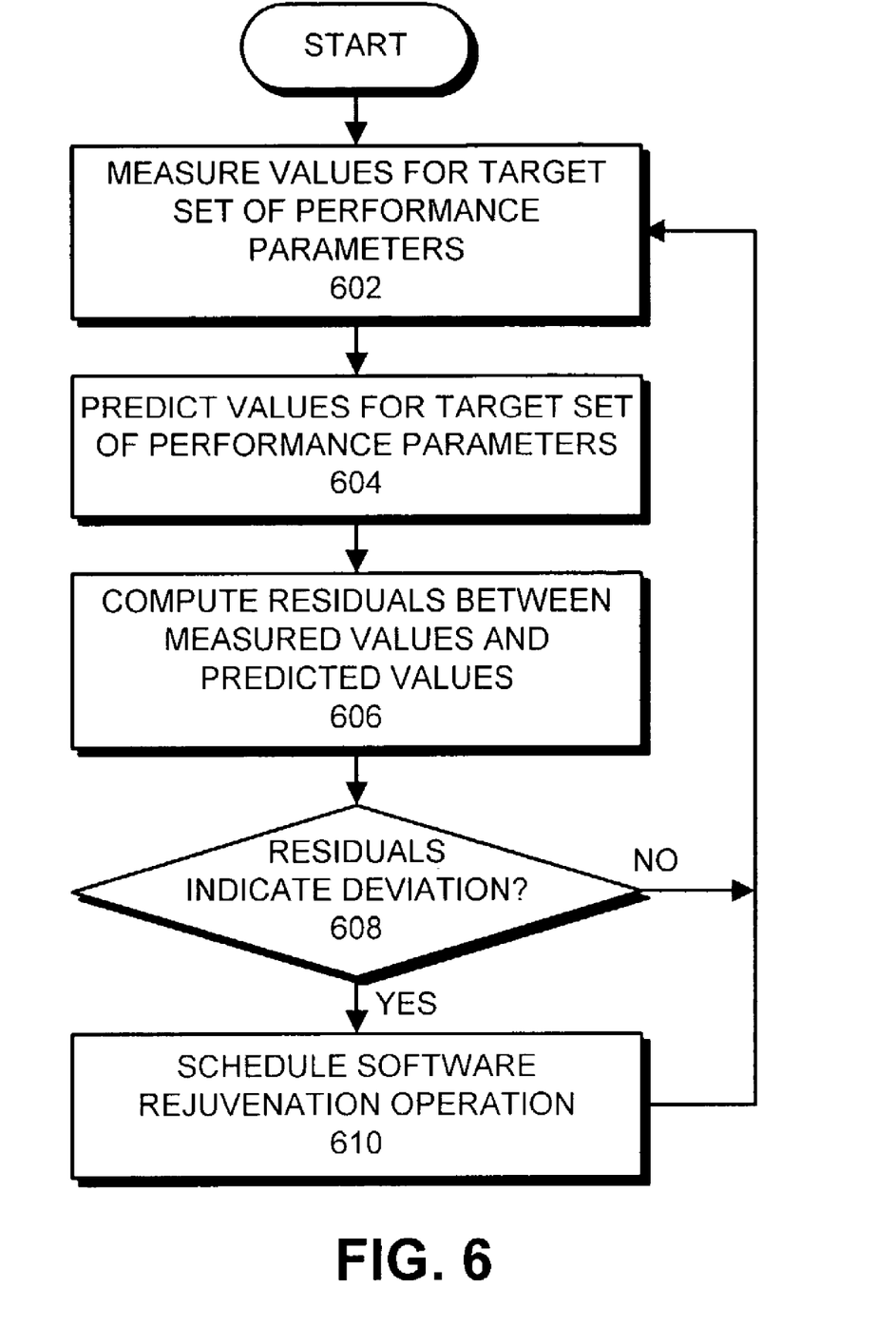
FIG. 6 presents a flow chart illustrating the software rejuvenation process in accordance with an embodiment of the present invention.

FIG. 6 presents a flow chart illustrating the software rejuvenation process in accordance with an embodiment of the present invention. The system starts when pattern recognition module 206 measures values for the target set of performance parameters when the system is in surveillance mode (step 602). Next, pattern recognition module 206 uses the measured values for the target set of performance parameters to predict values for other parameters (step 604). For example, if a first performance parameter is strongly correlated with a second and a third performance parameter, the value of the first performance parameter can be predicted from the measured values of the second and third performance parameters.

Next, the system produces a set of residuals by computing differences between the measured performance parameters and those estimated by the pattern recognition algorithm (step 606). The system then determines if the computed residuals exceed a predetermined threshold (step 608). This can involve computing a function of the residuals that produces a binary output indicating whether software aging is likely to have taken place. If not, the system returns to step 602 to repeat the measuring process.

Otherwise, if the residuals indicate a deviation has taken place, thereby indicating that software aging is likely to have occurred, the system schedules the software rejuvenation operation using software rejuvenation module 208 (step 610). Note that this scheduling operation can use any known optimization technique to schedule one or more rejuvenation operations in a manner that minimizes a specific cost function. This cost function can consider both the cost of the rejuvenation operations and the cost of any potential down time.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a multi-variate pattern-recognition technique to trigger software rejuvenation for a computer system, comprising:
    periodically measuring values for a target set of performance parameters associated with the computer system while the computer system is operating;
    predicting values for the target set of performance parameters based upon previously determined correlations between performance parameters in the target set of performance parameters, wherein predicting a value for a given performance parameter involves predicting the value from measured values of other performance parameters that are correlated with the given performance parameter;
    computing residuals for the target set of performance parameters by computing differences between the predicted values and the measured values for the target set of performance parameters; and
    if one or more of the computed residuals exceed a predetermined threshold, thereby indicating that software aging is likely to have occurred, scheduling a software rejuvenation operation for the computer system.

2. The method of claim 1, further comprising determining correlations between parameters in the target set of performance parameters based on measurements of the target set of performance parameters gathered during a training mode;
    wherein the training mode takes place during normal error-free operation of the computer system.

3. The method of claim 1, further comprising pre-filtering a larger set of performance parameters to identify the target set of performance parameters;
    wherein the pre-filtering operation eliminates redundant and/or poorly correlated performance parameters from the larger set of performance parameters to produce the target set of performance parameters.

4. The method of claim 3, wherein the pre-filtering operation determines correlations between performance parameters based on measurements of the larger set of performance parameters gathered during a training mode.

5. The method of claim 1, wherein scheduling the software rejuvenation operation involves sequencing the software rejuvenation operation in a way that minimizes a specific cost function of the software rejuvenation operation.

6. The method of claim 1, wherein the software rejuvenation operation involves at least one of:
    flushing stale locks;
    reinitializing application components;
    defragmenting memory;
    purging database shared memory pool latches;
    failing over between computing nodes;
    shutting down individual applications;
    preemptively rolling back; and
    performing a therapeutic reboot.

7. The method of claim 1, wherein the target set of performance parameters includes at least one of:
    system throughput parameters;
    processor load;
    system queue lengths;
    transaction latency; and
    an amount of available memory.

8. The method of claim 1, wherein the tasks of predicting values for the target set of performance parameters and scheduling the software rejuvenation operation are performed by a service processor that is co-located with other processors in the computer system.

9. The method of claim 1, wherein the tasks of predicting values for the target set of performance parameters and scheduling the software rejuvenation operation are performed by a remote service center that communicates with the computer system across a network.

10. A computer-readable storage medium storing instructions that when executed by a computer cause the computer to perform a method for using a multi-variate pattern-recognition technique to trigger software rejuvenation for a computer system, the method comprising:
periodically measuring values for a target set of performance parameters associated with the computer system while the computer system is operating;
predicting values for the target set of performance parameters based upon previously determined correlations between performance parameters in the target set of performance parameters, wherein predicting a value for a given performance parameter involves predicting the value from measured values of other performance parameters that are correlated with the given performance parameter;
computing residuals for the target set of performance parameters by computing differences between the predicted values and the measured values for the target set of performance parameters; and
if one or more of the computed residuals exceed a predetermined threshold, thereby indicating that software aging is likely to have occurred, scheduling a software rejuvenation operation for the computer system.

11. The computer-readable storage medium of claim 10, wherein the method further comprises determining correlations between parameters in the target set of performance parameters based on measurements of the target set of performance parameters gathered during a training mode;
wherein the training mode takes place during normal error-free operation of the computer system.

12. The computer-readable storage medium of claim 10, wherein the method further comprises pre-filtering a larger set of performance parameters to identify the target set of performance parameters;
wherein the pre-filtering operation eliminates redundant and/or poorly correlated performance parameters from the larger set of performance parameters to produce the target set of performance parameters.

13. The computer-readable storage medium of claim 12, wherein the pre-filtering operation determines correlations between performance parameters based on measurements of the larger set of performance parameters gathered during a training mode.

14. The computer-readable storage medium of claim 10, wherein scheduling the software rejuvenation operation involves sequencing the software rejuvenation operation in a way that minimizes a specific cost function of the software rejuvenation operation.

15. The computer-readable storage medium of claim 10, wherein the software rejuvenation operation involves at least one of:
flushing stale locks;
reinitializing application components;
defragmenting memory;
purging database shared memory pool latches;
failing over between computing nodes;
shutting down individual applications;
preemptively rolling back; and
performing a therapeutic reboot.

16. The computer-readable storage medium of claim 10, wherein the target set of performance parameters includes at least one of:
system throughput parameters;
processor load;
system queue lengths;
transaction latency; and
an amount of available memory.

17. The computer-readable storage medium of claim 10, wherein the tasks of predicting values for the target set of performance parameters and scheduling the software rejuvenation operation are performed by a service processor that is co-located with other processors in the computer system.

18. The computer-readable storage medium of claim 10, wherein the tasks of predicting values for the target set of performance parameters and scheduling the software rejuvenation operation are performed by a remote service center that communicates with the computer system across a network.

19. An system that uses a multi-variate pattern-recognition technique executed by processor to trigger software rejuvenation for a computer system, comprising:
a measurement mechanism configured to periodically measure values for a target set of performance parameters associated with the computer system while the computer system is operating;
a prediction mechanism configured to predict values for the target set of performance parameters based upon previously determined correlations between performance parameters in the target set of performance parameters, wherein predicting a value for a given performance parameter involves predicting the value from measured values of other performance parameters that are correlated with the given performance parameter;
computing residuals for the target set of performance parameters by computing differences between the predicted values and the measured values for the target set of performance parameters; and
a software rejuvenation mechanism, wherein if one or more of the computed residuals exceed a predetermined threshold, thereby indicating that software aging is likely to have occurred, the software rejuvenation mechanism is configured to schedule a software rejuvenation operation for the computer system.

20. The system of claim 19, further comprising a correlation mechanism configured to determine correlations between parameters in the target set of performance parameters based on measurements of the target set of performance parameters gathered during a training mode;
wherein the training mode takes place during normal error-free operation of the computer system.

21. The system of claim 19, further comprising a pre-filtering mechanism configured to pre-filter a larger set of performance parameters to identify the target set of performance parameters;
wherein the pre-filtering mechanism eliminates redundant and/or poorly correlated performance parameters from the larger set of performance parameters to produce the target set of performance parameters.

22. The system of claim 21, wherein the pre-filtering mechanism determines correlations between performance parameters based on measurements of the larger set of performance parameters gathered during a training mode.

23. The system of claim 19, wherein the software rejuvenation mechanism is configured to sequence the software rejuvenation operation in a way that minimizes a specific cost function of the software rejuvenation operation.

24. The system of claim 19, wherein the software rejuvenation mechanism is configured to perform at least one of:
flush stale locks;
reinitialize application components;
defragment memory;
purge database shared memory pool latches;
fail over between computing nodes;
shut down individual applications;
preemptively roll back; and to
perform a therapeutic reboot.

25. The system of claim 19, wherein the target set of performance parameters includes at least one of:
system throughput parameters;
processor load;
system queue lengths;
transaction latency; and
an amount of available memory.

26. The system of claim 19, wherein the prediction mechanism and the software rejuvenation mechanism are located within a service processor that is co-located with other processors in the computer system.

27. The system of claim 19, wherein the prediction mechanism and the software rejuvenation mechanism are located within a remote service center that communicates with the computer system across a network.

* * * * *